United States Patent
Moriya et al.

(10) Patent No.: US 7,649,292 B2
(45) Date of Patent: Jan. 19, 2010

(54) ROTATING ELECTRICAL MACHINE AND HYBRID DRIVE UNIT PROVIDED WITH THE SAME

(75) Inventors: Kazunari Moriya, Seto (JP); Yukio Inaguma, Nagoya (JP); Hiroo Fuma, Gifu (JP)

(73) Assignee: Kabushiki Kaisha Toyota Chuo Kenkyusho, Aichi-Gun (JP)

( * ) Notice: Subject to any disclaimer, the term of this patent is extended or adjusted under 35 U.S.C. 154(b) by 503 days.

(21) Appl. No.: 11/583,073

(22) Filed: Oct. 19, 2006

(65) Prior Publication Data

US 2007/0090707 A1    Apr. 26, 2007

(30) Foreign Application Priority Data

Oct. 20, 2005    (JP)    ............... 2005-306423

(51) Int. Cl.
*H02K 16/00*    (2006.01)
(52) U.S. Cl. ........................... 310/114; 310/112
(58) Field of Classification Search .......... 310/112–115
See application file for complete search history.

(56) References Cited

U.S. PATENT DOCUMENTS

| | | | | |
|---|---|---|---|---|
| 2,825,829 A | * | 3/1958 | Bowes | 310/102 R |
| 3,862,444 A | * | 1/1975 | Hale | 310/74 |
| 5,703,423 A | * | 12/1997 | Fukao et al. | 310/90.5 |
| 5,886,445 A | * | 3/1999 | Hsu | 310/211 |
| 5,973,460 A | * | 10/1999 | Taga et al. | 318/139 |

FOREIGN PATENT DOCUMENTS

| | | |
|---|---|---|
| JP | A 11-168852 | 6/1999 |
| JP | A 2001-258159 | 9/2001 |
| JP | A 2001-339976 | 12/2001 |
| JP | A 2002-095288 | 3/2002 |

* cited by examiner

*Primary Examiner*—Dang D Le
(74) *Attorney, Agent, or Firm*—Oliff & Berridge, PLC (57) ABSTRACT

An induction machine includes a stator provided with stator windings and a first rotor provided with first rotor windings, and generates an induction current in one of the stator windings and the first rotor windings by a rotating magnetic field generated in the other of the stator windings and the first rotor windings. A synchronous machine includes a second rotor which is provided with second rotor windings connected to the first rotor windings and coupled to the first rotor, and a third rotor which is provided with permanent magnets and rotatable independent of the second rotor, and a torque acts between the second rotor and the third rotor due to the interaction between the rotating magnetic field generated in the second rotor windings and the field flux generated in the permanent magnets.

10 Claims, 12 Drawing Sheets

ROTATING ELECTRICAL MACHINE AND HYBRID DRIVE UNIT PROVIDED WITH THE SAME

BACKGROUND OF THE INVENTION a) Field of the Invention

The present invention relates to a rotating electrical machine capable of performing power generation and electric power generation, and a hybrid drive unit provided with the same.

b) Description of the Related Art

Figure 8:
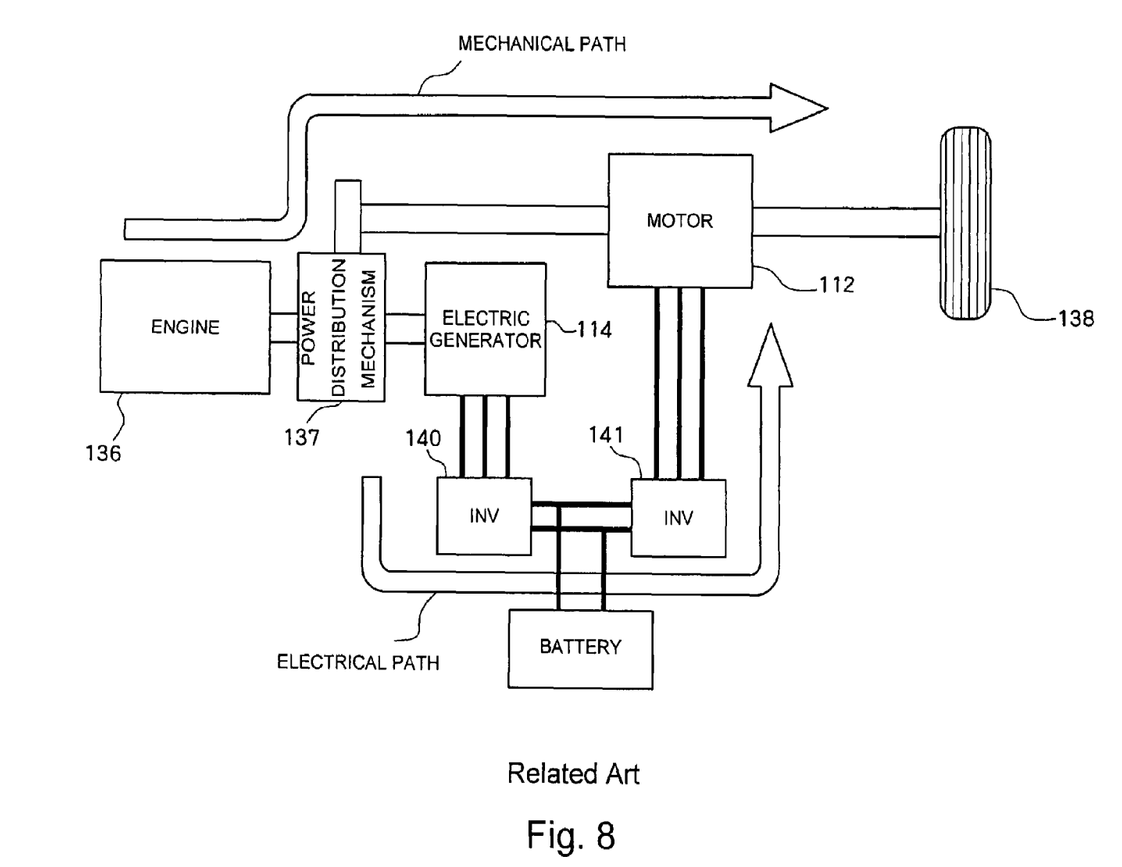
FIG. 8 is a diagram schematically showing a structure of the hybrid drive unit according to a related art.

For a hybrid drive unit having an engine and an electric motor as power generation sources, there is proposed, for example, the structure shown in FIG. 8. In the structural example shown in FIG. 8, the power of an engine 136 is divided in two by a power distribution mechanism 137 which is comprised of a planetary gear mechanism. One half of the distributed power of the engine 136 is transmitted to a wheel 138, and the other half of the distributed power of the engine 136 is converted into electrical power generated by an electrical generator 114. The electrical power generated by the electrical generator 114 undergoes electrical power conversion by the inverters 140, 141 (from AC to DC by an inverter 140, and from DC to AC by an inverter 141) and supplied to a motor 112. The motor 112 drives to rotate the wheel 138 by converting the supplied electrical power into the power of a rotor (not shown). Thus, the structure shown in FIG. 8 is provided as a power transmission path between the engine 136 and the wheel 138 with a transmission path (transmission path based on a mechanical path) which transmits the mechanical power from the engine 136 to the wheel 138 and a transmission path (transmission path based on an electric path) running via the electric generator 114, the inverters 140, 141, and the motor 112.

Also, structures of rotating electrical machines are disclosed in, for example, Japanese Patent Laid-Open Publication No. 2001-339976 (Patent publication 1), Japanese Patent Laid-Open Publication No. 2001-258159 (Patent publication 2) Japanese Patent Laid-Open Publication No. 2002-95288 (Patent publication 3), and Japanese Patent Laid-Open Publication No. Hei 11-168852 (Patent publication 4). The rotating electrical machines according to Patent publication 1 and Patent publication 3 are configured of two induction machines each having a stator and a rotor. The rotors of the two induction machines are mutually coupled, and the rotor windings of the two induction machines are mutually connected.

The rotating electrical machine according to Patent publication 2 is comprised of an induction machine having a stator and a rotor and a synchronous machine having a stator and a rotor. Also, the rotor of the induction machine is coupled to the rotor of the synchronous machine.

The rotating electrical machine according to Patent publication 4 comprises a first stator which has a first armature coil for mainly conducting conversion of energy with the outside, a first rotor which is disposed facing the first stator with a gap between them, a second stator which has a second armature coil and is disposed to face the first rotor with another gap between them, a flywheel which is supported by the rotation shaft of the first rotor so to be independently rotatable, and a second rotor which is coupled to the flywheel at a position facing the first rotor with another gap between them. Conductors are respectively disposed on a surface of the first rotor facing the second stator and another surface facing the second rotor, and they are connected. A conductor is also disposed on a surface of the second rotor facing the first rotor. According to Patent publication 4, the induction machine is configured of the first rotor and the second stator which are disposed facing each other. Another induction machine is also configured of the first rotor and the second rotor which are disposed facing each other.

According to the above-described structural example shown in FIG. 8, the power is transmitted through the electrical path via the inverters 140, 141, but the electrical power conversion by the inverters 140, 141 causes loss. Therefore, the loss caused when the power is transmitted through the electric path increases, resulting in a problem that power transmission efficiency is lowered.

SUMMARY OF THE INVENTION

Under the circumstances described above, the present invention provides a rotating electrical machine in which loss can be reduced and a hybrid drive unit provided with such an electrical machine.

A rotating electrical machine according to the present invention comprises an induction machine which includes a stator having a stator conductor capable of producing a rotating magnetic field and a first rotor having a first rotor conductor capable of producing a rotating magnetic field, and produces an induction current in one of the stator conductor and the first rotor conductor by a rotating magnetic field generated in the other of the stator conductor and the first rotor conductor; and a synchronous machine which includes a second rotor coupled to the first rotor and having a second rotor conductor connected to the first rotor conductor and capable of generating a rotating magnetic field, and a third rotor having a magnetic pole for generating field flux and rotatable independent of the second rotor, and exerts a torque between the second rotor and the third rotor by the interaction between the rotating magnetic field generated by the second rotor conductor and the field flux generated by the magnetic pole.

According to the invention, the third rotor of the synchronous machine and the first rotor of the induction machine are independently rotatable, and a transmission path based on a mechanical path via the second rotor and a transmission path based on an electrical path via the second rotor conductor and the first rotor conductor are disposed as the power transmission path between the third rotor and the first rotor. The power transmission through the electrical path via the second rotor conductor and the first rotor conductor can be conducted without carrying out the electrical power conversion by an electrical power converter such as an inverter, so that the loss caused at the time of the power transmission through the electrical path can be reduced. Thus, the present invention can reduce the loss caused at the time of the power transmission between the third rotor and the first rotor.

The hybrid drive unit according to the invention is provided with the rotating electrical machine according to the invention and an engine which is coupled to one of the first rotor and the third rotor and can produce power, and can output the power from an output shaft coupled to the other of the first rotor and the third rotor.

DETAILED DESCRIPTION OF THE PREFERRED EMBODIMENTS

Figure 1:
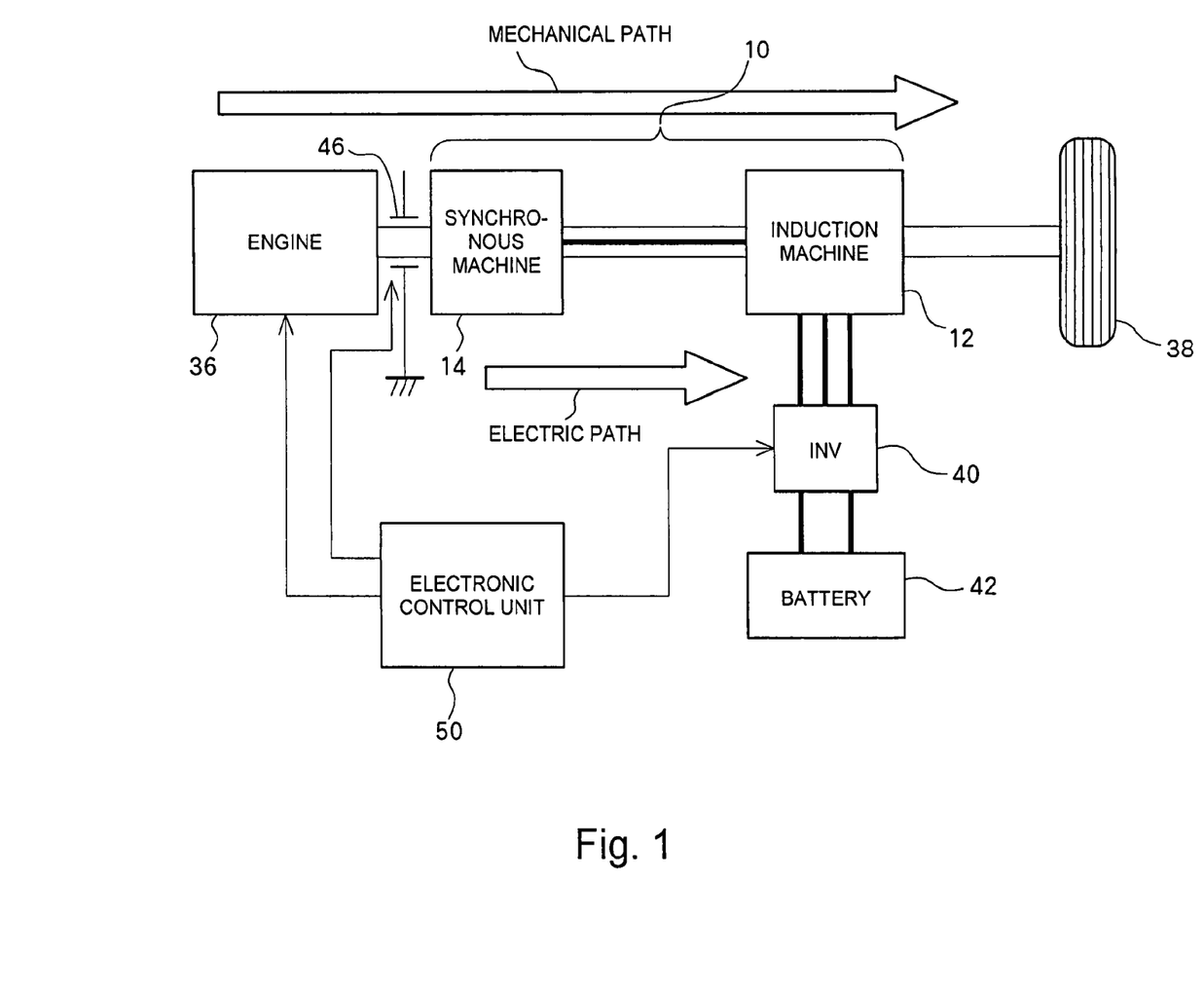
FIG. 1 is a diagram schematically showing the structure of a hybrid drive unit having a rotating electrical machine according to an embodiment of the invention.
Figure 2:
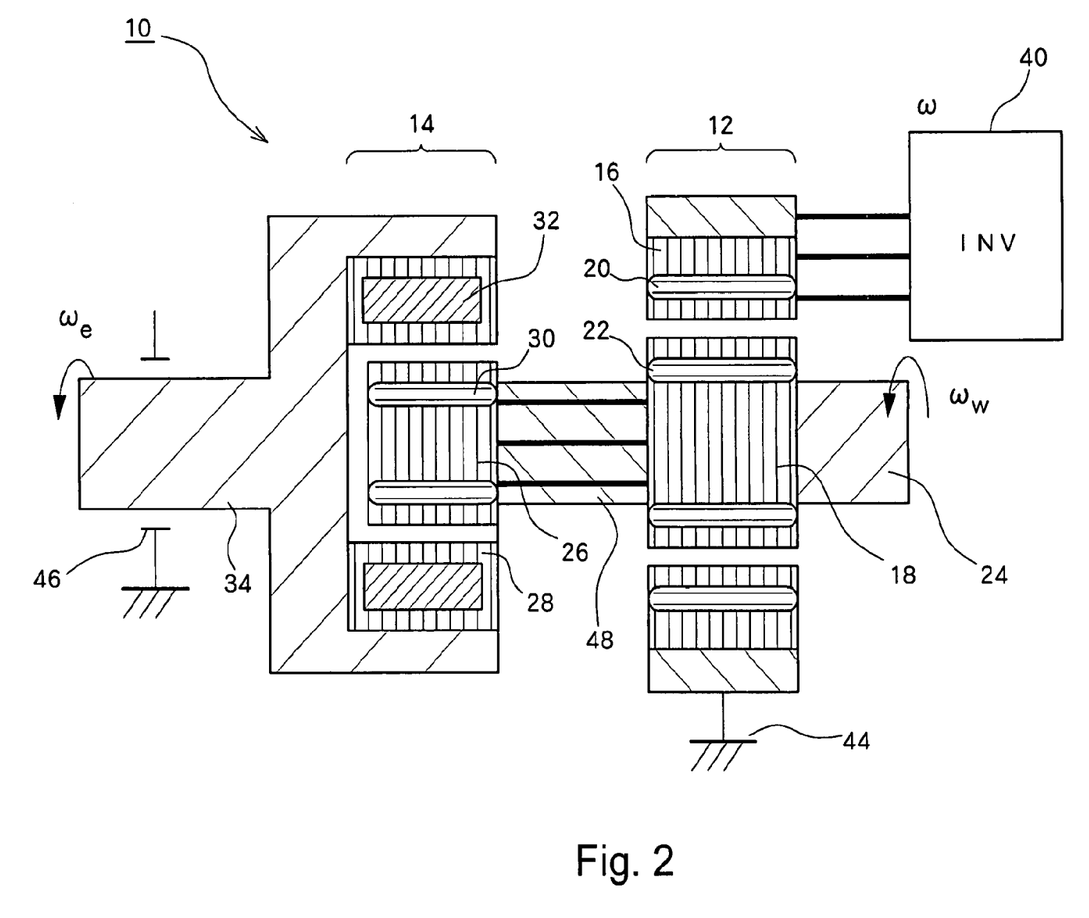
FIG. 2 is a diagram schematically showing the structure of the rotating electrical machine according to the embodiment of the invention.

Preferred embodiments of the invention will be described below. FIG. 1 and FIG. 2 are diagrams schematically showing the structures of a hybrid drive unit having a rotating electrical machine according to an embodiment of the invention. FIG. 1 schematically shows the entire structure, and FIG. 2 schematically shows the structure of a rotating electrical machine 10. The hybrid drive unit according to this embodiment has an engine (internal combustion engine) 36 capable of producing power, and the rotating electrical machine 10 disposed between the engine 36 and a wheel 38. Also, the rotating electrical machine 10 has an induction machine 12 coupled to the wheel 38 and a synchronous machine 14 disposed between the engine 36 and the induction machine 12. For example, the hybrid drive unit according to this embodiment can be used as a power output device for driving a vehicle.

The induction machine 12 includes a stator (stator) 16 which is fixed to an outer frame 44 and a rotor (first rotor) 18 which is disposed within the stator 16 and rotatable with respect to the stator 16. The stator 16 has plural phases (e.g., three phases) of stator windings 20 disposed as a stator conductor along the circumferential direction of the stator 16. Plural phases (e.g., three phases) of AC current flow through the plural phases of stator windings 20, so that the stator windings 20 can produce a rotating magnetic field rotating in the circumferential direction of the stator.

The rotor 18 is coupled to an output shaft 24 of the rotating electrical machine 10, and the output shaft 24 of the rotating electrical machine 10 is coupled to the wheel 38. The rotor 18 has plural phases (e.g., three phases) of rotor windings 22 disposed as a first rotor conductor along the circumferential direction thereof. AC current flows through the plural phases of rotor windings 22, so that the rotor windings 22 can produce a rotating magnetic field rotating in the circumferential direction of the rotor. The rotor windings 22 are disposed to face the stator windings 20, and the rotating magnetic field generated by one of the stator windings 20 and the rotor windings 22 causes generation of induction current at the other of the stator windings 20 and the rotor windings 22. A torque acts between the stator 16 and the rotor 18 as a result of the rotating magnetic field and the induction current.

The synchronous machine 14 includes a rotor (second rotor) 26 and a rotor (third rotor) 28 which is disposed outside of the rotor 26 and rotatable independent of the rotor 26. The rotor (inner rotor) 26 is coupled to the rotor 18 of the induction machine 12 through a rotation shaft 48. The rotor 26 has plural phases (e.g., three phases) of rotor windings 30 disposed as a second rotor conductor along the circumferential direction thereof. AC current flows to the plural phases of rotor windings 30, so that the rotor windings 30 can generate a rotating magnetic field which rotates in the circumferential direction of the rotor.

The rotor windings 30 are electrically connected (directly connected) to the rotor windings 22. Here, the rotor windings 22 and the rotor windings 30 are connected in a reverse phase so that the direction of the rotating magnetic field generated when the AC current flows to the rotor windings 22 and the rotor windings 30 becomes opposite to each other between the rotor windings 22 and the rotor windings 30. For example, in a case where the rotor windings 22 and the rotor windings 30 are configured of three phases of windings, i.e., phase a, phase b and phase c, the phase a of the rotor windings 22 and the phase a of the rotor windings 30 are connected, the phase b of the rotor windings 22 and the phase c of the rotor windings 30 are connected, and the phase c of the rotor windings 22 and the phase b of the rotor windings 30 are connected, so that the directions of the rotating magnetic fields generated by the rotor windings 22 and the rotor windings 30 become opposite to each other. Also, the rotor windings 22 and the rotor windings 30 are disposed so to be magnetically insulated from each other.

The rotor (outer rotor) 28 is coupled to an input shaft 34 of the rotating electrical machine 10, and the input shaft 34 of the rotating electrical machine 10 is coupled to the engine 36. The rotor 28 has plural permanent magnets 32 disposed as magnetic poles for generating field flux along the circumferential direction thereof. The permanent magnets 32 face the rotor windings 30, and a torque acts between the rotor 26 and the rotor 28 by interaction between the rotating magnetic field generated by the rotor windings 30 and the field flux generated by the permanent magnets 32. Thus, the synchronous machine 14 is configured of a PM (permanent magnet) type synchronous machine which is provided with the two rotors 26, 28 rotatable independent of each other. Also, the rotating electrical machine 10 according to this embodiment is a 2-shaft type rotating electrical machine having two rotation shafts (the input shaft 34 and the output shaft 24) rotatable independent of each other.

A rechargeable and dischargeable secondary battery 42 disposed as a DC power source stores electrical energy. An inverter 40 has a switching element (not shown), and the switching operation of the switching element can convert the DC voltage from the secondary battery 42 to AC (e.g., three-phase AC with different phases at every 120 degrees) and can allow the AC current to flow to the individual phases of the stator windings 20 of the induction machine 12. Besides, the inverter 40 can also convert the AC current flowing to the individual phases of the stator windings 20 into DC current so as to convert a direction to regenerate the electrical energy into the secondary battery 42. Thus, the inverter 40 can perform the electrical power conversion in both directions, and the stator windings 20 of the induction machine 12 can send and receive electrical power to and from the secondary battery 42.

A brake 46 can switch between its engagement and disengagement to switch between locking and releasing of the rotation of the input shaft 34 of the rotating electrical machine 10, namely the engine 36 and the rotor 28.

An electronic control unit 50 controls the switching operation of the switching element of the inverter 40 to control the AC current flowing to the individual phases of the stator windings 20 of the induction machine 12. Also, the electronic control unit 50 controls the operation conditions of the engine 36. The electronic control unit 50 also switches between the engagement and disengagement of the brake 46 to control the switching between locking and releasing of the rotations of the input shaft 34 (the engine 36 and the rotor 28) of the rotating electrical machine 10.

The operation of the hybrid drive unit according to the embodiment will now be described below.

In a case where the power of the engine 36 is used to drive a load (to drive to rotate the wheel 38), the electronic control unit 50 controls the brake 46 to a disengaged state, thereby controlling the switching operation of the switching element of the inverter 40. When the engine 36 is driven to rotate, the rotor 28 of the synchronous machine 14 coupled to the engine 36 is driven to rotate, and field flux generated by the permanent magnets 32 disposed on the rotor 28 forms the rotating magnetic field. The rotating magnetic field produced by the rotations of the permanent magnets 32 generates an induction current in the rotor windings 30 disposed in the rotor 26, and the induction current flowing through the rotor windings 30 produces a rotating magnetic field in the rotor 26. In the synchronous machine 14, the torque acts on the rotor 26 to rotate it by the attraction action between the rotating magnetic field generated in the rotor windings 30 and the field flux generated in the permanent magnets 32. In other words, the wheel 38 coupled to the rotor 26 is driven to rotate.

The rotor windings 30 of the synchronous machine 14 are electrically connected to the rotor windings 22 of the induction machine 12, so that the induction current generated in the rotor windings 30 also flows to the rotor windings 22, and the rotating magnetic field is also produced in the rotor 18 of the induction machine 12 by the induction current flowing to the rotor windings 22. Induction current is also generated in the stator windings 20 by the rotating magnetic field generated in the rotor windings 22, and the torque acts on the rotor 18 due to the rotating magnetic field and the induction current. Here, the directions of the rotating magnetic fields generated when the induction current flows through the rotor windings 22 and the rotor windings 30 are opposite to each other between the rotor windings 22 and the rotor windings 30, so that the direction of the torque acting on the rotor 18 of the induction machine 12 is the same to that of the torque acting on the rotor 26 of the synchronous machine 14. Thus, the wheel 38 coupled to the rotor 18 is driven to rotate by the torque acting on the rotor 18 of the induction machine 12.

As described above, this embodiment has, as the power transmission path between the engine 36 (the input shaft 34) and the wheel 38 (the output shaft 24) as shown in FIG. 1, the transmission path (transmission path by a mechanical path) via the rotor 26 and the rotation shaft 48 and the transmission path (transmission path by an electrical path) via the rotor windings 30 and the rotor winding 22. In the mechanical path, the power of the engine 36 is converted to the power of the rotor 26 of the synchronous machine 14, and the power of the rotor 26 is output from the output shaft 24 through the rotation shaft 48. Meanwhile, in the electrical path, the power of the engine 36 is converted to the electrical power of the rotor windings 30 and the rotor windings 22, and the electrical power of the rotor windings 22 is converted to the power of the rotor 18 of the induction machine 12 and output from the output shaft 24. The power transmitted to the wheel 38 also becomes a total of the transmission power through the mechanical path and the transmission power through the electrical path. In this embodiment, the power transmission through the electrical path can be performed without performing the conversion of the electrical power by the inverter. Therefore, loss produced at the time of the power transmission through the electrical path can be reduced.

The electronic control unit 50 of this embodiment can also control the power of the rotor 18 of the induction machine 12 by controlling the switching operation of the switching element of the inverter 40, and can control the drive of the load. For example, the electronic control unit 50 controls the switching operation of the inverter 40 to supply the electrical power from the secondary battery 42 to the stator windings 20 of the induction machine 12, so that the rotating magnetic field can be produced in the stator 16. An induction current is generated in the rotor windings 22 by the rotating magnetic field produced in the stator windings 20, and the torque can act on the rotor 18 due to the rotating magnetic field and the induction current, with the wheel 38 which is coupled to the rotor 18 then being driven to rotate. Thus, the induction machine 12 performs powering operation in this embodiment by supplying the electrical power from the secondary battery 42 to the stator windings 20 of the induction machine 12 to drive the wheel 38 to rotate by the power of the engine 36, and the driving of the wheel 38 can be assisted by the power of the rotor 18 generated by using the electrical power supplied to the stator winding 20. In this case, the power transmitted to the wheel 38 becomes larger than that of the engine 36.

Meanwhile, the electronic control unit 50 controls the switching operation of the inverter 40 to recover the electrical power from the stator windings 20 of the induction machine 12 to the secondary battery 42 so as to perform the regenerative operation of the induction machine 12. Thus, the power of the engine 36 is used to drive the wheel 38 to rotate, and the power of the engine 36 is partially converted to the electrical power of the stator windings 20 of the induction machine 12, which can be recovered by the secondary battery 42. In this case, the power transmitted to the wheel 38 becomes smaller than that of the engine 36. The electronic control unit 50 also controls the switching operation of the inverter 40 to recover electrical power from the stator windings 20 of the induction machine 12 to the secondary battery 42 during a load deceleration operation, so that the power of the load can be converted to the electrical power of the stator windings 20 of the induction machine 12 and recovered by the secondary battery 42.

In a case where an EV (Electric Vehicle) travel which drives a load (drives the wheel 38 to rotate) by using the power of the rotating electrical machine 10 without using the power of the engine 36 is performed in this embodiment, the electronic control unit 50 controls to put the brake 46 in an engaged state to lock the rotation of the engine 36 and the rotor 28. In that state, the electronic control unit 50 controls the switching operation of the inverter 40 to control the drive of the load. For example, the electronic control unit 50 controls the switching operation of the inverter 40 to supply the electrical power from the secondary battery 42 to the stator windings 20 of the induction machine 12, so as to produce the rotating magnetic field in the stator 16. An induction current is generated in the rotor windings 22 by the rotating magnetic field generated in the stator windings 20, and the torque acts on the rotor 18. The induction current generated in the rotor windings 22 also flows to the rotor windings 30 to generate a rotating magnetic field, which is in a direction opposite to that of the rotating magnetic field of the rotor 18, in the rotor 26 of the synchronous machine 14. As a result of the interaction between the rotating magnetic field generated in the rotor windings 30 and the field flux generated in the permanent magnets 32, the torque in the same direction as that of the torque of the rotor 18 acts on the rotor 26. Therefore, the wheel 38 coupled to the rotors 18, 26 is driven to rotate. Meanwhile, the electronic control unit 50 controls the switching operation of the inverter 40 to recover the electrical power from the stator windings 20 of the induction machine 12 to the secondary battery 42 during the load deceleration operation, so that the power of the load can be converted to the electrical power of the stator windings 20 of the induction machine 12 and recovered by the secondary battery 42.

Characteristic equations of the rotating electrical machine 10 according to this embodiment will now be described with reference to FIG. 3A to FIG. 3D. For the derivation of the characteristic equations, it is necessary to consider the induction machine 12 and the synchronous machine 14 on the same coordinate system, so that the coordinate conversion is performed as described below. However, FIG. 3A to FIG. 3D show a case where the number of pole pairs of the induction machine 12 and the synchronous machine 14 is equal to 1, and the stator windings 20 and the rotor windings 22, 30 each are configured of three phases of windings of phase a, phase b and phase c.

Figure 3A:
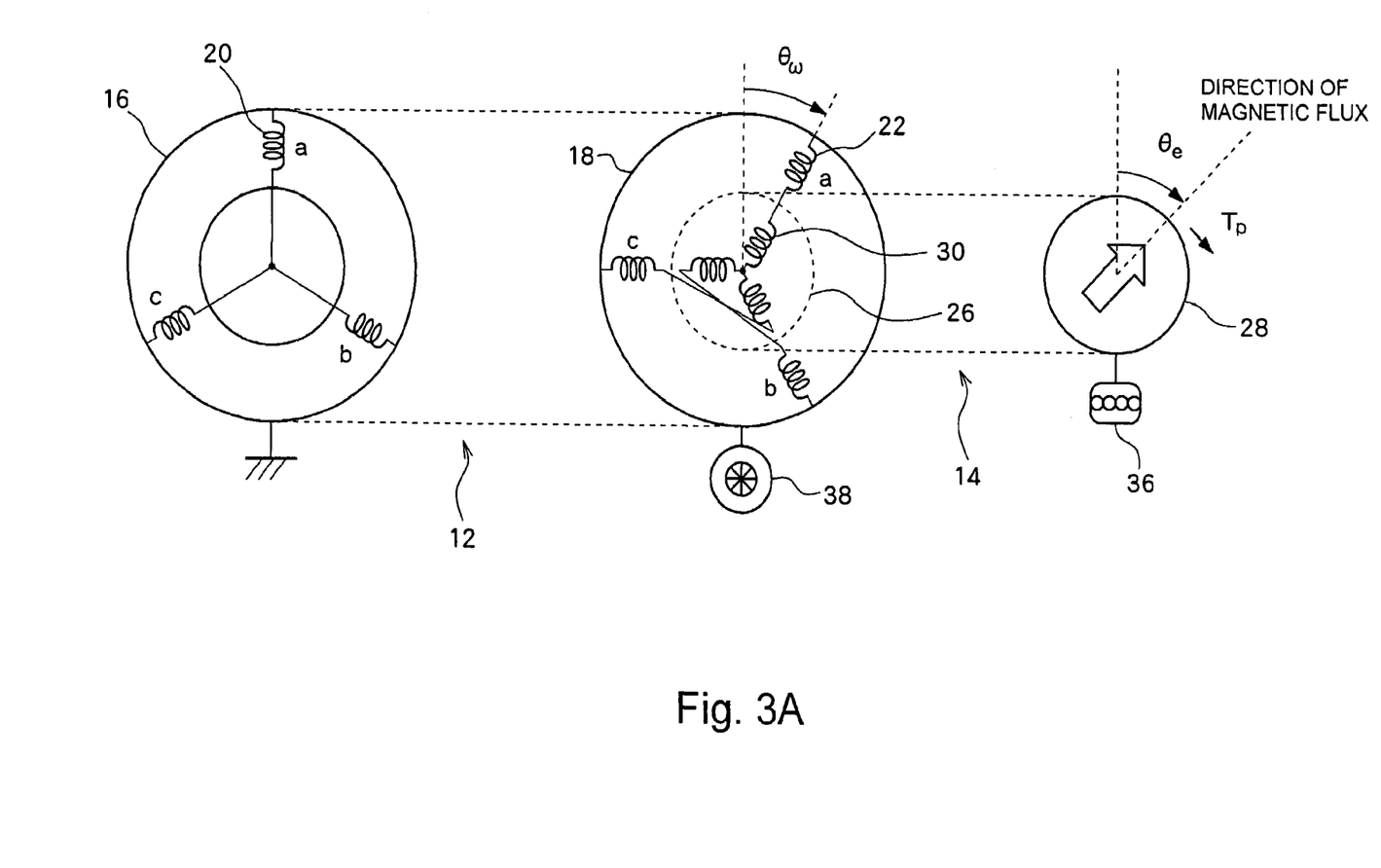
FIG. 3A is a diagram illustrating coordinate conversion conducted to derive a characteristic equation of the rotating electrical machine according to an embodiment of the invention.
Figure 3B:
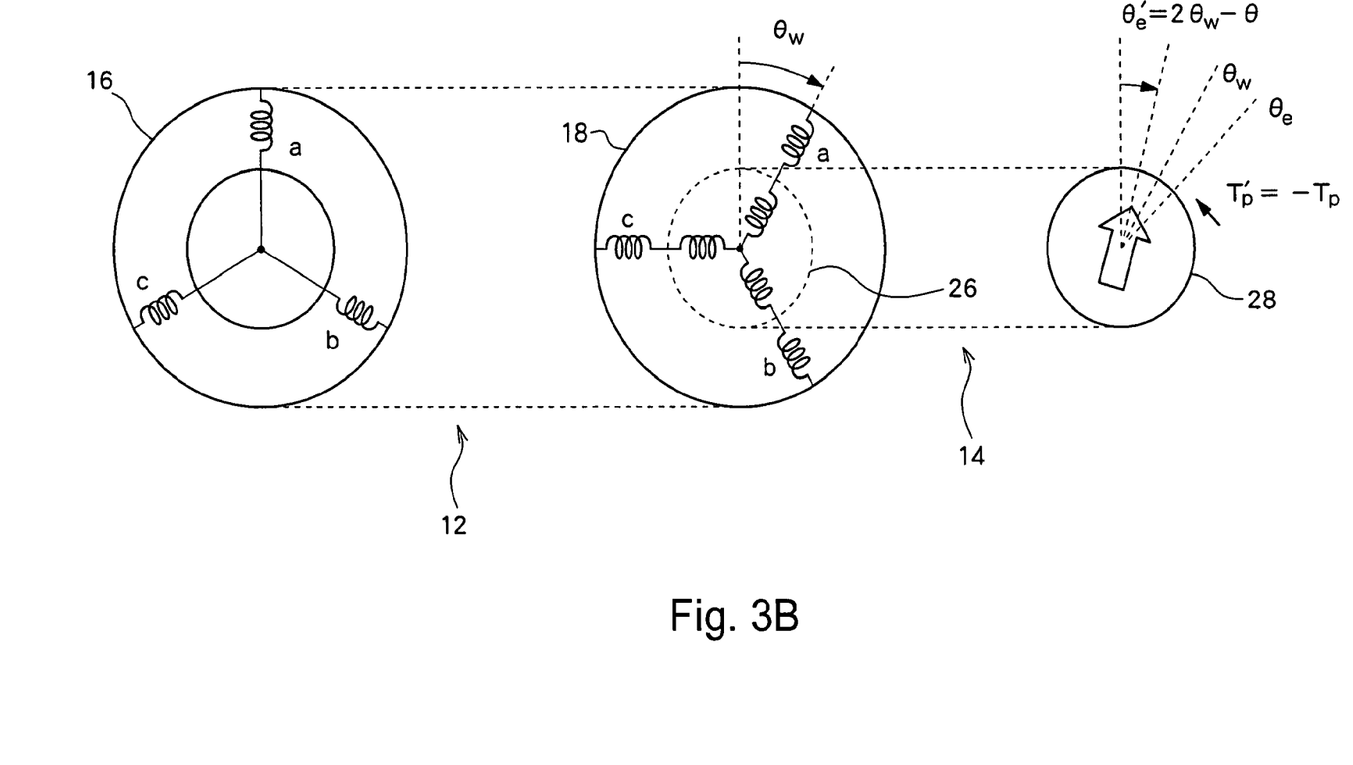
FIG. 3B is a diagram illustrating coordinate conversion conducted to derive a characteristic equation of the rotating electrical machine according to an embodiment of the invention.

As shown in FIG. 3A, to form rotating magnetic fields in opposite directions with the rotor 18 of the induction machine 12 and the rotor 26 of the synchronous machine 14, the phase a of the rotor windings 22 of the induction machine 12 and the phase a of the rotor windings 30 of the synchronous machine 14 are connected, the phase b of the rotor windings 22 and the phase c of the rotor windings 30 are connected, and the phase c of the rotor windings 22 and the phase b of the rotor windings 30 are connected. Accordingly, as shown in FIG. 3B, the synchronous machine 14 is reversed together with the rotor windings 30, with the phase a of the rotor windings 22 determined as a symmetrical axis. In FIG. 3A and FIG. 3B, $\theta_{ww}$ denotes rotation angles of the rotors 18, 26, $\theta_e$ denotes a rotation angle of the rotor 28, and $T_p$ denotes torque of the rotor 28 (with the rotation direction of the engine 36 determined to be positive). As shown in FIG. 3B, a rotation angle $\theta_e'$ of the rotor 28 after the reversed rotation is $2\times\theta_w-\theta_e$, and torque $T_p'$ of the rotor 28 after the reversed rotation is $-T_p$.

Figure 3C:
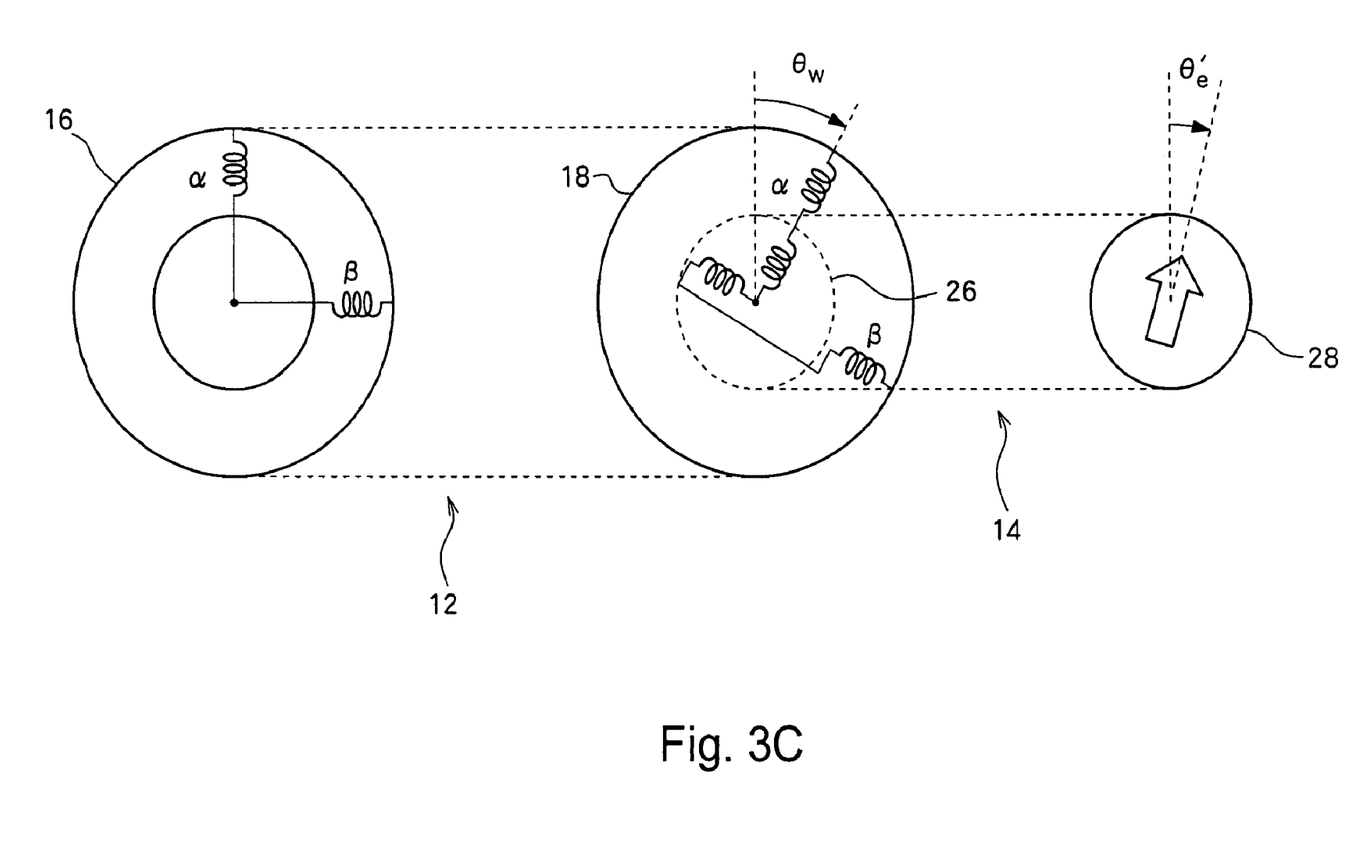
FIG. 3C is a diagram illustrating coordinate conversion conducted to derive a characteristic equation of the rotating electrical machine according to an embodiment of the invention.

Then, three-phase to two-phase transformation is performed as shown in FIG. 3C. An α-β axis after the three-phase to two-phase transformation shown in FIG. 3C is a coordinate system fixed to the winding. Transformation matrix A of the three-phase to two-phase transformation is expressed by the following equation (1).

$$A = \sqrt{\frac{2}{3}} \begin{bmatrix} 1 & -\frac{1}{2} & -\frac{1}{2} & 0 & 0 & 0 \\ 0 & \frac{\sqrt{3}}{2} & -\frac{\sqrt{3}}{2} & 0 & 0 & 0 \\ 0 & 0 & 0 & 1 & -\frac{1}{2} & -\frac{1}{2} \\ 0 & 0 & 0 & 0 & \frac{\sqrt{3}}{2} & -\frac{\sqrt{3}}{2} \end{bmatrix} \quad (1)$$

Figure 3D:
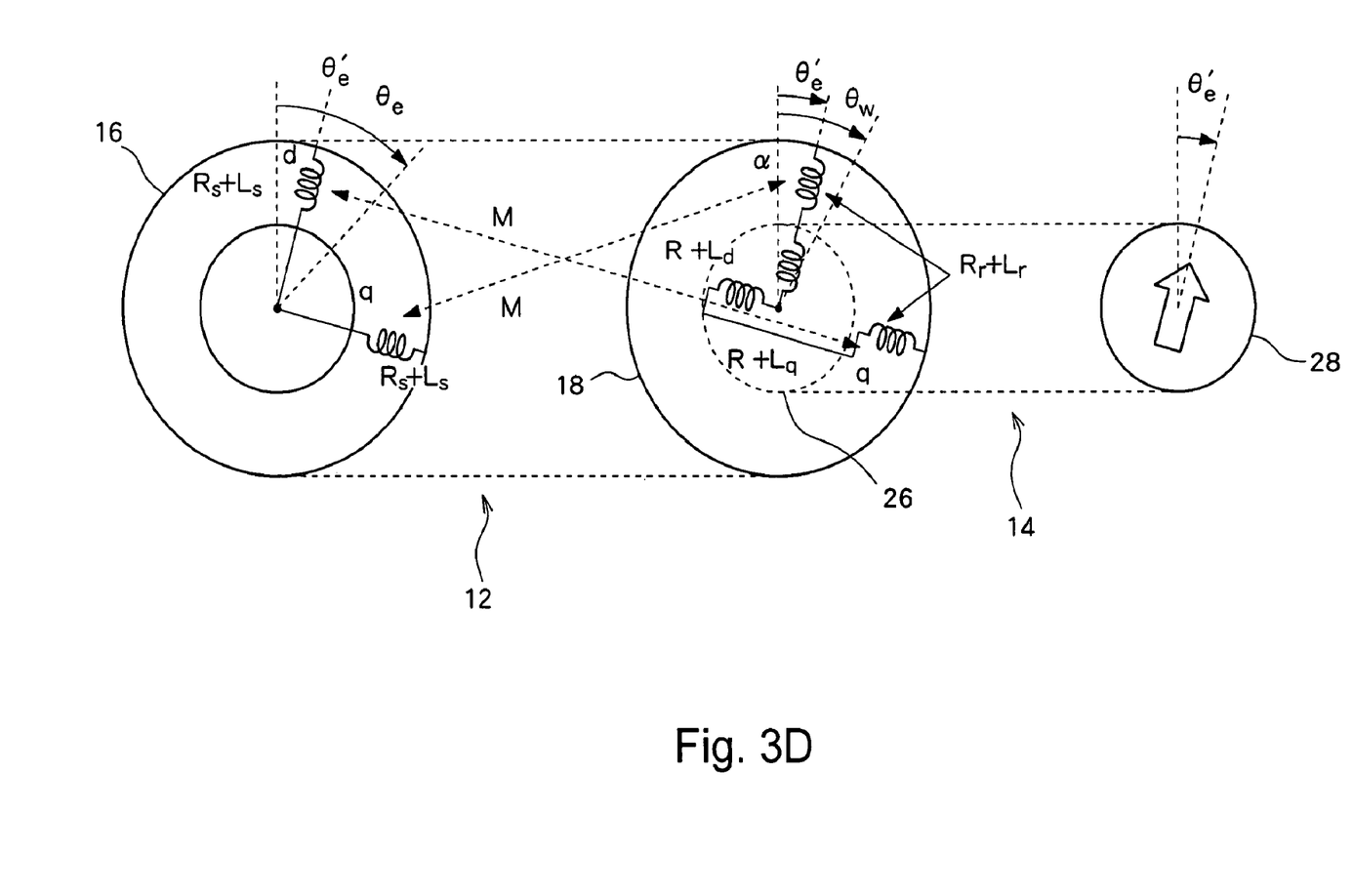
FIG. 3D is a diagram illustrating coordinate conversion conducted to derive a characteristic equation of the rotating electrical machine according to an embodiment of the invention.

Synchronization coordinate transformation for transformation to a coordinate system synchronized with magnetic flux is performed as shown in FIG. 3D. The d-q axis after the synchronization coordinate conversion shown in FIG. 3D is a coordinate system synchronized with the magnetic flux. Transformation matrix B of the synchronization coordinate transformation is expressed by the following equation (2).

$$B = \begin{bmatrix} \cos\theta_e' & \sin\theta_e' & 0 & 0 \\ -\sin\theta_e' & \cos\theta_e' & 0 & 0 \\ 0 & 0 & \cos(\theta_e'-\theta_w) & \sin(\theta_e'-\theta_w) \\ 0 & 0 & -\sin(\theta_e'-\theta_w) & \cos(\theta_e'-\theta_w) \end{bmatrix} \quad (2)$$

For the characteristic equation of the synchronous machine (PM type synchronous machine) 14, a voltage equation of a known d-q coordinate system can be used considering a model having been converted to a d-q synchronous coordinate. When it is considered that the phase a of the rotor windings 22 is used as a symmetrical axis for reversion at the time of the coordinate transformation, the following equation (3) is obtained.

$$\begin{bmatrix} v_d \\ v_q \end{bmatrix} = \begin{bmatrix} R+PL_d & -\omega_{pe}L_q \\ \omega_{pe}L_d & R+PL_q \end{bmatrix} \begin{bmatrix} i_d \\ i_q \end{bmatrix} + \begin{bmatrix} 0 \\ \omega_{pe}\Phi \end{bmatrix} \quad (3)$$

$\omega_{pe}$: Electrical angular velocity of PM type synchronous machine
$L_d$: Inductance of d shaft winding of PM type synchronous machine
$L_q$: Inductance of q shaft winding of PM type synchronous machine
R: Winding resistance of PM type synchronous machine
Φ: Magnetic flux amount of PM type synchronous machine
$P_p$: Number of pole pairs of PM type synchronous machine
P: Differential operator
$v_d$: d-axis voltage of PM type synchronous machine
$v_q$: q-axis voltage of PM type synchronous machine
$i_d$: d-axis current of PM type synchronous machine
$i_q$: q-axis current of PM type synchronous machine Considering the positional relationship and the rotation directions of the rotors 26, 28, electrical angular velocity $\omega_{pe}$ of the synchronous machine 14 is expressed by the following equation (4).

$$\omega_{pe}=P_p\omega_p=P_p(\omega_e'-\omega_w)=P_p(\omega_w-\omega_e) \quad (4)$$

In the equation (4), $\omega_p$ denotes a mechanical angular velocity of the synchronous machine 14, $\omega_e$ denotes an angular velocity ($=d\theta_e/dt$) of the input shaft 34 (engine 36), and $\omega_w$ denotes an angular velocity ($=d\theta_w/dt$), $\omega_e'=2\times\omega_w-\omega_e$ of the output shaft 24 (wheel 38).

Meanwhile, as to a characteristic equation of the induction machine 12, both the stator 16 and the rotor 18 can be expressed by a γ–δ coordinate system synchronized with a power supply cycle, and the following equation (5) can be obtained. However, it is assumed that a γ axis direction is a magnetic flux direction of the synchronous machine (PM type synchronous machine) 14.

$$\begin{bmatrix} v_{\gamma s} \\ v_{\delta s} \\ v_{\gamma r} \\ v_{\delta r} \end{bmatrix} = \begin{bmatrix} R_s + PL_s & -\omega L_s & PM & -\omega M \\ \omega L_s & R_s + PL_s & \omega M & PM \\ PM & -\omega_{pe} M & R_r + PL_r & -\omega_{pe} L_r \\ \omega_{pe} M & PM & \omega_{pe} L_r & R_r + PL_r \end{bmatrix} \begin{bmatrix} i_{\gamma s} \\ i_{\delta s} \\ i_{\gamma r} \\ i_{\delta r} \end{bmatrix} \quad (5)$$

ω: Electrical angular frequency supplied to stator of induction machine
$L_x$: Stator winding self-inductance of induction machine
$L_r$: Rotor winding self-inductance of induction machine
M: Mutual inductance between stator winding and rotor winding of induction machine
$R_s$: Stator winding resistance of induction machine
$R_r$: Rotor winding resistance of induction machine
pi: Number of pole pairs of induction machine
$v_{\gamma s}$: γ-axis stator voltage of induction machine
$v_{\delta s}$: δ-axis stator voltage of induction machine
$v_{\gamma r}$: γ-axis rotor voltage of induction machine
$v_{\delta r}$: δ-axis rotor voltage of induction machine
$i_{\gamma s}$: γ-axis stator current of induction machine
$i_{\delta s}$: δ-axis stator current of induction machine
$i_{\gamma r}$: γ-axis rotor current of induction machine
$i_{\delta r}$: δ-axis rotor current of induction machine Electrical angular frequency ω of the stator winding 20 of the induction machine 12 is expressed by the following equation (6).

$$\omega = P_i \omega_w + \omega_{pe} = (P_i + P_p)\omega_w - P_p \omega_e \quad (6)$$

As described above, the rotor winding 22 of the induction machine 12 and the rotor winding 30 of the synchronous machine 14 are electrically connected (directly connected), so that $v_d = v_{\gamma r}$, $v_q = v_{\delta r}$, $i_d = -i_{\gamma r}$, and $i_q = -i_{\delta r}$ in the equations (3) and (5). Combination of the equations (3) and (5) provides the following equation (7).

$$\begin{bmatrix} v_{\gamma s} \\ v_{\delta s} \\ v_{\gamma r} - v_d \\ v_{\delta r} - v_q \end{bmatrix} = \quad (7)$$

$$\begin{bmatrix} R_s + PL_s & -\omega L_s & PM & -\omega M \\ \omega L_s & R_s + PL_s & \omega M & PM \\ PM & -\omega_{pe} M & R_r + R + P(L_r + L_d) & -\omega_{pe}(L_r + L_q) \\ \omega_{pe} M & PM & \omega_{pe}(L_r + L_d) & R_r + R + P(L_r + L_d) \end{bmatrix}$$

$$\begin{bmatrix} i_{\gamma s} \\ i_{\delta s} \\ i_{\gamma r} \\ i_{\delta r} \end{bmatrix} - \begin{bmatrix} 0 \\ 0 \\ 0 \\ \omega_{pe} \Phi \end{bmatrix}$$

Also, torque $T_p$ of the synchronous machine 14 and torque $T_i$ of the induction machine 12 are expressed by the following equations (8) and (9).

$$T_p = -p_p[\Phi(-i_{\delta r}) + (L_d - L_q)(-i_{\delta r})(-i_{\gamma r})] \quad (8)$$

$$T_i = p_i M(i_{\delta s} i_{\gamma r} - i_{\gamma s} i_{\delta r}) \quad (9)$$

Slip of the induction machine 12 is expressed by the following equation (10).

$$s = \frac{\omega_{pe}}{\omega} = \frac{p_p(\omega_w - \omega_e)}{(p_p + p_i)\omega_w - p_p \omega_e} \quad (10)$$

Figure 4:
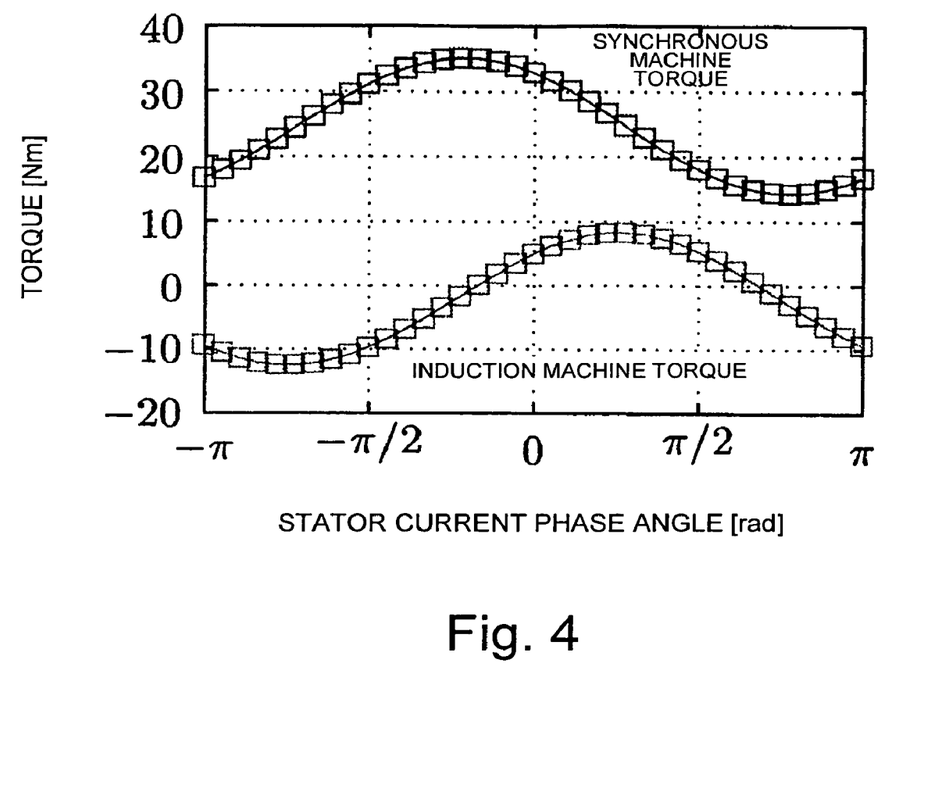
FIG. 4 is a diagram showing examples of calculated torque characteristics of a synchronous machine and an induction machine with respect to a change in stator current phase angle.

Here, an example of calculating the characteristics of torque $T_p$ of the synchronous machine 14 and torque $T_i$ of the induction machine 12 with respect to a change in stator current phase angle is shown in FIG. 4. FIG. 4 shows an example where the torque $T_p$ of the synchronous machine 14 and the torque $T_i$ of the induction machine 12 are calculated under conditions of $\omega_e$=200[rad/s], $\omega_w$=190 [rad/s], and stator current of 100 [A]. In this embodiment, the torque $T_p$ of the synchronous machine 14 and the torque $T_i$ of the induction machine 12 can be controlled by controlling the stator current phase angle as shown in FIG. 4.

In the above-described embodiment, the power transmission through the electrical path via the rotor windings 30 and the rotor windings 22 can be performed without performing the electrical power conversion by the inverter. Therefore, loss caused at the time of the power transmission through the electrical path can be decreased, and power transmission efficiency between the engine 36 and the wheel 38 can be improved. The number of inverters can also be decreased in this embodiment in comparison with the above-described structure shown in FIG. 8, so that miniaturization and cost reduction of the device can be realized.

In this embodiment, the functions of a torque converter can also be realized by the rotating electrical machine 10 disposed between the engine 36 and the wheel 38. The input shaft 34 (rotor 28) and the output shaft 24 (rotors 18, 26) are rotatable independently, so that a clutch for switching between engagement and disengagement of the engine 36 and the wheel 38 can be omitted.

Patent publications 1, 3 disclose a rotating electrical machine having the rotors of the two induction machines mutually coupled and the rotor windings of the two induction machines mutually connected. However, the two induction machines of Patent publications 1, 3 are configured of the stator and the rotor, and the rotation electrical machine has one rotation shaft. Meanwhile, the rotating electrical machine 10 of this embodiment has two rotation shafts which are independently rotatable, so that it is different from Patent publications 1, 3. Further, the rotating electrical machine 10 according to this embodiment is also different from Patent publication 1, 3 in the point that the synchronous machine 14 and the induction machine 12 are coupled to each other. Patent publication 2 discloses a rotating electrical machine having the rotor of the induction machine and the rotor of the synchronous machine coupled to each other. However, Patent publication 2 has the induction machine and the synchronous machine each configured of the stator and the rotor, the rotation electrical machine has one rotation shaft. Besides, Patent publication 2 does not disclose that the rotor winding of the induction machine and the rotor winding of the synchronous machine are connected. Patent publication 4 has the induction machine configured of the first rotor and the second stator which are disposed facing each other, and another induction machine configured of the first rotor and the second rotor which are disposed facing each other. Meanwhile, the rotating electrical machine 10 of this embodiment is different from Patent publication 4 in the point that the synchronous machine 14 and the induction machine 12 are coupled together. Also, Patent publication 4 does not have any description about the direction of the rotating magnetic field formed by the two conductors disposed on the first rotor. Thus, the rotating electrical machine 10 according to this embodiment is different from those of Patent publications 1 to 4.

When it is assumed that the rotor 28 is provided with an induction winding and the induction machine is configured of the rotors 26, 28, a slip ring and an inverter are required for supplying electrical power to the induction winding of the rotor 28, but, this embodiment eliminates the necessity of a slip ring and an inverter by disposing the permanent magnets 32 on the rotor 28. Besides, the torque of the synchronous machine 14 and the torque of the induction machine 12 can be freely controlled by controlling the stator current phase angle with respect to the magnet flux.

Another structure example of this embodiment will now be described.

Figure 5A:
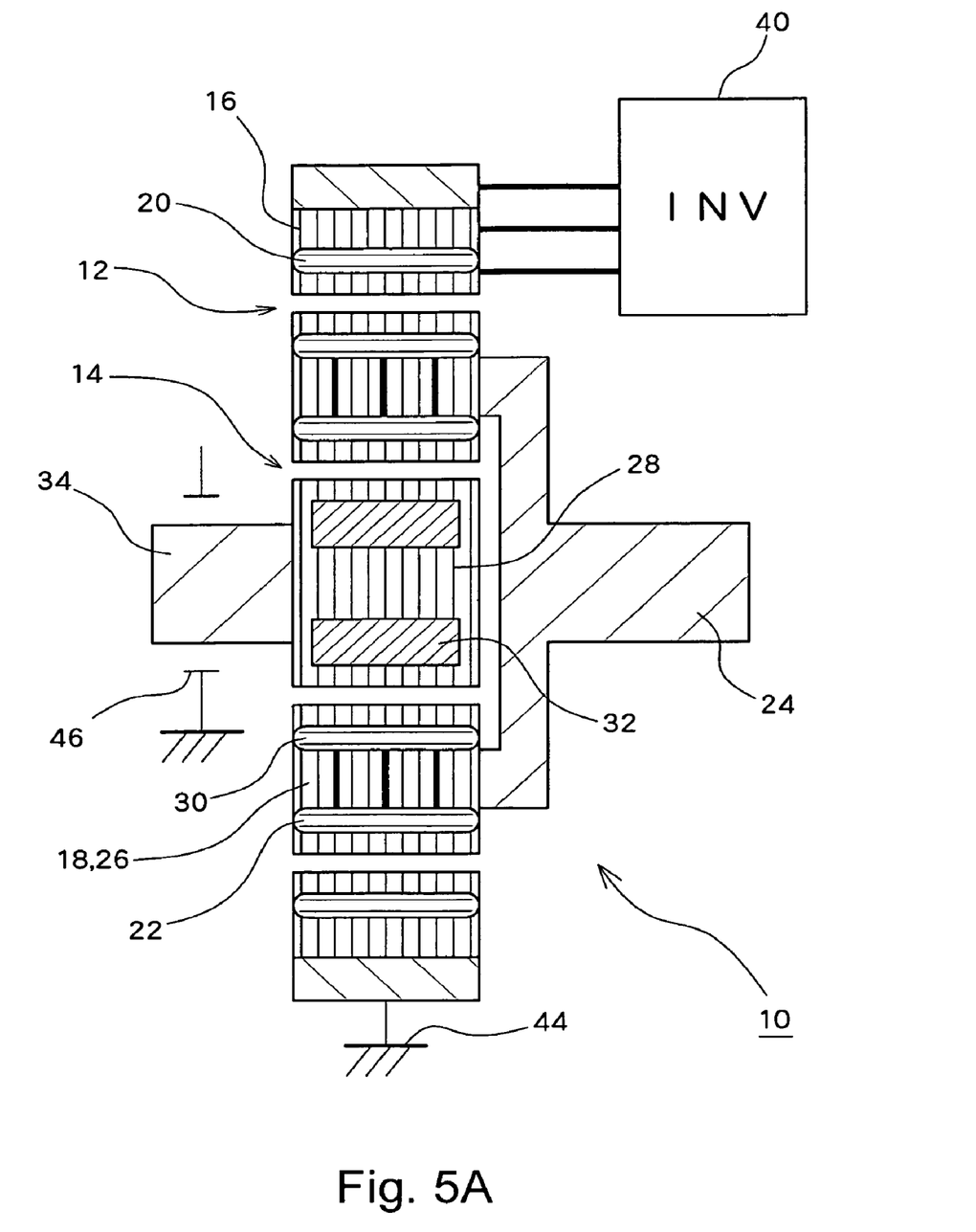
FIG. 5A is a diagram schematically showing another structure of the rotating electrical machine according to the embodiment of the invention.
Figure 5B:
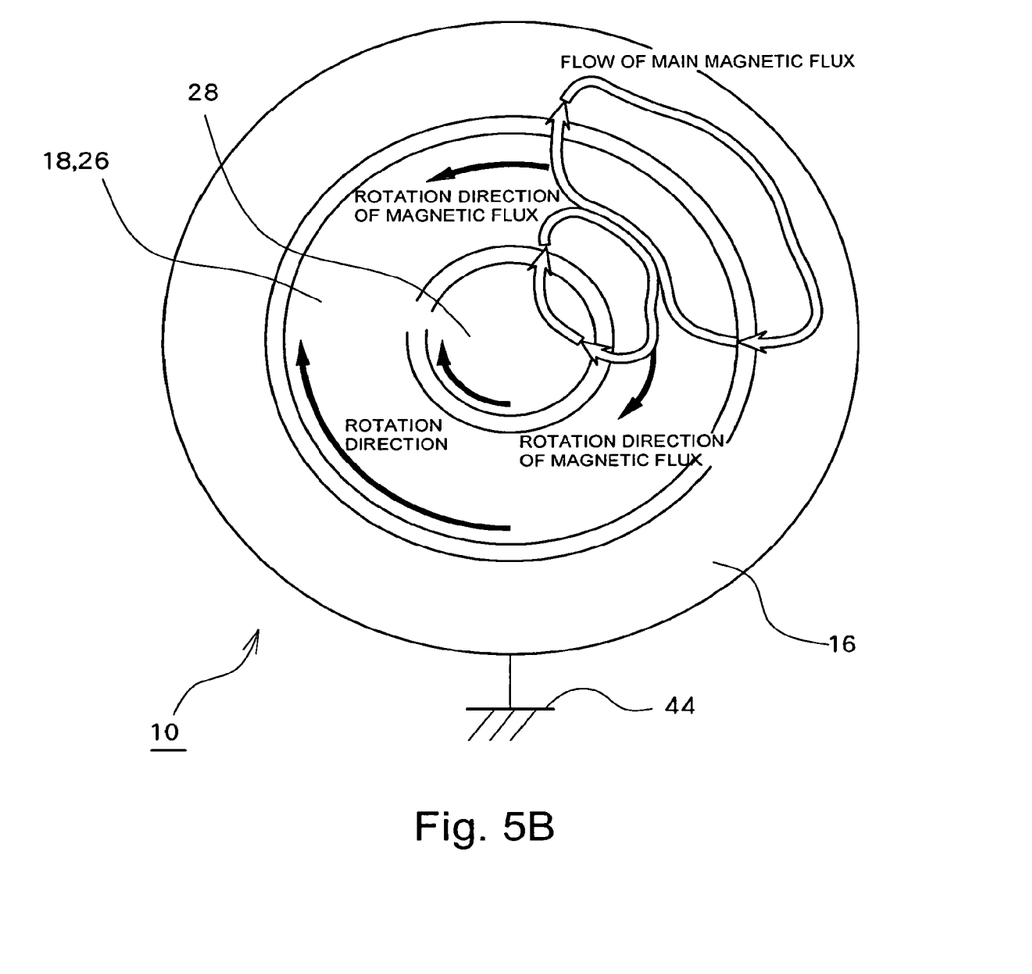
FIG. 5B is a diagram schematically showing another structure of the rotating electrical machine according to the embodiment of the invention.

In the structure examples shown in FIG. 5A and FIG. 5B, the rotor 26 of the synchronous machine 14 and the rotor 18 of the induction machine 12 are integrally configured. The rotors 18, 26 are disposed outside of the rotor 28 of the synchronous machine 14, and the stator 16 of the induction machine 12 is disposed outside of the rotors 18, 26. The remaining structure and operation of FIG. 5A and FIG. 5B are the same as those of the structure example shown in FIG. 2.

Figure 6:
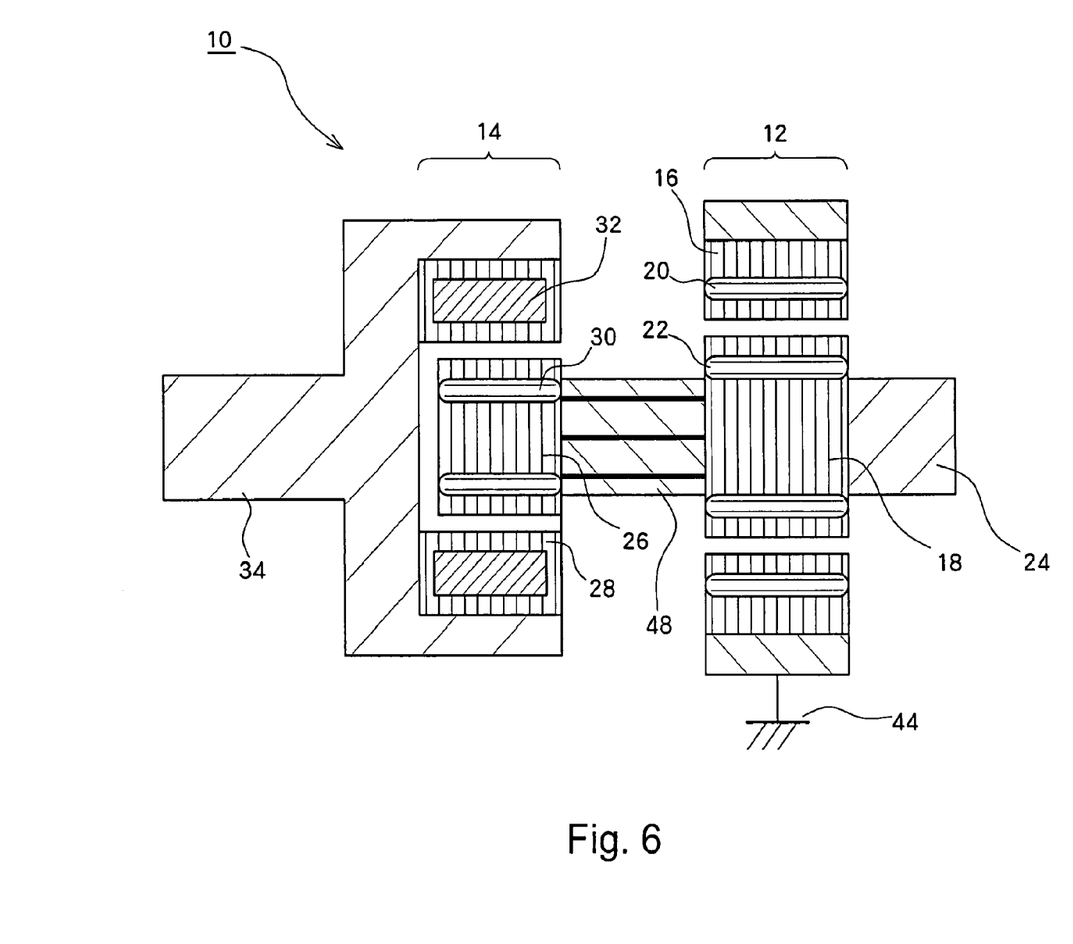
FIG. 6 is a diagram schematically showing another structure of the rotating electrical machine according to the embodiment of the invention.

In comparison with the structure example shown in FIG. 2, the brake 46 and the inverter 40 are omitted in the structural example shown in FIG. 6, and the stator winding 20 disposed on the stator 16 of the induction machine 12 is short-circuited. However, as the stator conductor disposed on the stator 16, a cage type conductor can be used instead of the stator winding 20 (short-circuited winding). The output shaft 24 of the rotating electrical machine 10 is coupled to the wheel 38 via a transmission (not shown).

In the structural example shown in FIG. 6, the engine 36 coupled to the input shaft 34 of the rotating electrical machine 10 is driven to rotate, so that the rotor 28 is driven to rotate to produce a rotating magnetic field due to the field flux generated by the permanent magnets 32. An induction current is produced in the rotor windings 30 by the rotating magnetic field, and a rotating magnetic field is produced in the rotor 26. Also, As a result of the interaction (the attraction action) between the rotating magnetic field of the rotor windings 30 and the field flux of the permanent magnets 32, the torque acts on the rotor 26 to drive to rotate the rotor 26 (wheel 38). Further, the induction current generated in the rotor windings 30 also flows to the rotor windings 22, and the rotating magnetic field which is in a direction opposite to that of the rotating magnetic field of the rotor 26 is formed in the rotor 18, so that the induction current is produced in the stator windings 20. Because of the rotating magnetic field due to the rotor windings 22 and the induction current due to the stator windings 20, the torque in the same direction as that of the torque of the rotor 26 acts on the rotor 18. The wheel 38 is also driven to rotate by the torque acting on the rotor 18. Thus, a transmission path based on the mechanical path through the rotor 26 and rotation shaft 48 and a transmission path based on the electrical path via the rotor winding 30 and the rotor windings 22 are also disposed as the power transmission paths between the input shaft 34 and the output shaft 24 in the structure example shown in FIG. 6. The functions of the torque converter can also be realized by the rotating electrical machine 10 in the structure example shown in FIG. 6. The clutch for switching between engagement, and disengagement of the engine 36 and the wheel 38 can be omitted because the input shaft 34 (rotor 28) and the output shaft 24 (rotors 18, 26) are independently rotatable.

Figure 7:
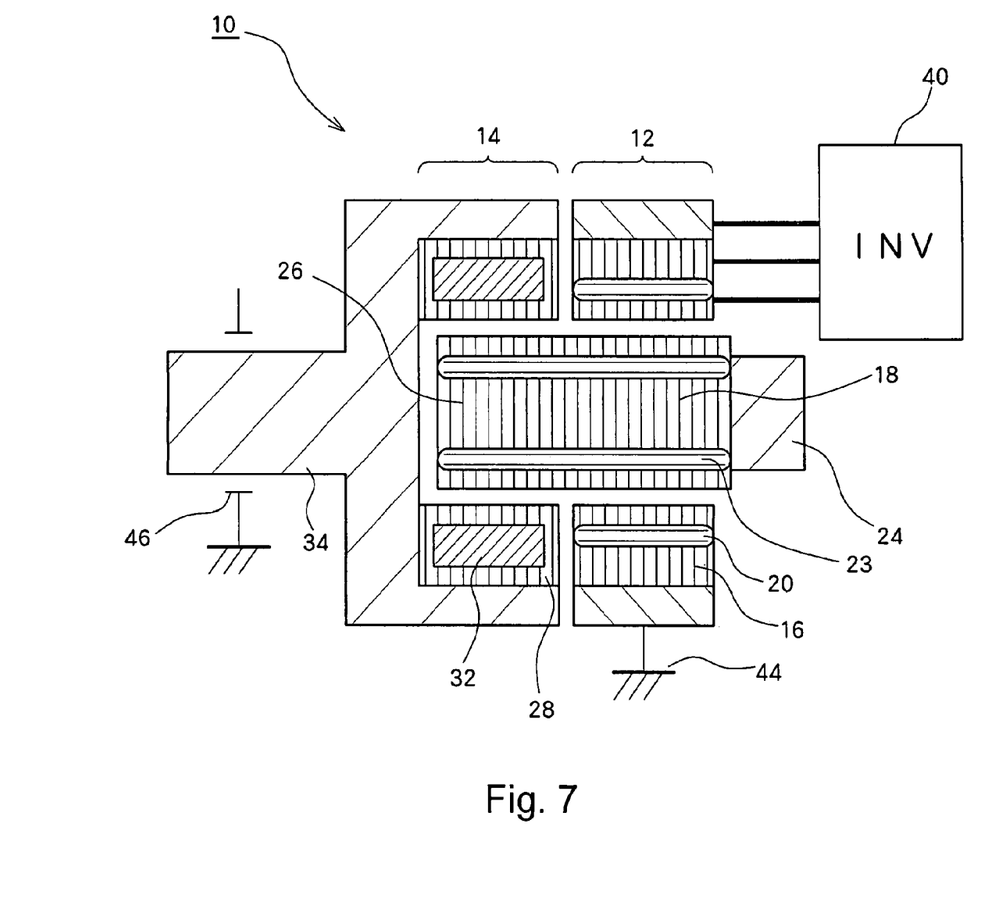
FIG. 7 is a diagram schematically showing another structure of the rotating electrical machine according to the embodiment of the invention.

In the structural example shown in FIG. 7, the rotor 26 of the synchronous machine 14 and the rotor 18 of the induction machine 12 are integrally configured different from the structure example shown in FIG. 2. Also, the rotor conductor which is disposed in the rotors 18, 26 is configured of an integral cage type conductor 23. According to the structural example shown in FIG. 7, the structures of the rotors 18, 26 can be simplified.

In the above-described structural examples shown in FIG. 2, FIG. 5A, FIG. 5B, FIG. 6 and FIG. 7, electromagnets can be used instead of the permanent magnets 32 as the magnetic poles disposed in the rotor 28 of the synchronous machine 14. In a case where the electromagnets are disposed in the rotor 28, the field flux can be generated by the electromagnets by causing a current to flow to the windings of the electromagnets via a slip ring. Also, in the case where the electromagnets are disposed in the rotor 28, a current to the windings of the electromagnets can be stopped when, for example, a load is low.

In the above-described structure examples shown in FIG. 2, FIG. 5A, FIG. 5B, FIG. 6 and FIG. 7, the input shaft 34 and the output shaft 24 of the rotating electrical machine 10 can be replaced. Specifically, the rotor 18 of the induction machine 12 (the rotor 26 of the synchronous machine 14) is coupled to the engine 36, and the rotor 28 of the synchronous machine 14 can be coupled to the wheel 38. In such a case, it is possible to provide the brake 46 which can switch between locking and releasing of the rotations of the rotors 18, 26 (engine 36) by switching between engagement and disengagement. Also, in this embodiment, the brake 46 which can switch between locking and releasing of the rotations by switching between engagement and disengagement can be disposed on both sides of the input shaft 34 and the output shaft 24 of the rotating electrical machine 10.

It is to be understood that the present invention is not limited to the above-described embodiments for practicing the invention, and various modifications maybe made in various modes without deviating from the spirit and scope of the invention.

What is claimed is:

1. A rotating electrical machine, comprising:
an induction machine which includes a stator having a stator conductor capable of producing a rotating magnetic field and a first rotor having a first rotor conductor capable of producing a rotating magnetic field, and produces an induction current in one of the stator conductor and the first rotor conductor by a rotating magnetic field generated in the other of the stator conductor and the first rotor conductor, thereby exerting a torque between the stator and the first rotor; and
a synchronous machine which includes a second rotor coupled to the first rotor and having a second rotor conductor connected to the first rotor conductor and capable of generating a rotating magnetic field, and a third rotor having a magnetic pole for generating field flux and rotatable independent of the second rotor, and exerts a torque between the second rotor and the third rotor by the interaction between the rotating magnetic field generated by the second rotor conductor and the field flux generated by the magnetic pole,
wherein the first rotor conductor and the second rotor conductor are connected to cause the rotating magnetic fields, generated when electric current flows through the first rotor conductor and the second rotor conductor, to be in opposite directions between the first rotor conductor and the second rotor conductor, so that a torque exerted to the first rotor and a torque exerted to the second rotor are in the same direction.

2. The rotating electrical machine according to claim 1, wherein both the first rotor conductor and the second rotor conductor are configured of a plurality of phases of windings.

3. The rotating electrical machine according to claim 1, wherein the stator conductor can send and receive electrical power to and from a power source.

4. The rotating electrical machine according to claim 1, wherein the stator conductor is configured of plural phases of windings.

5. The rotating electrical machine according to claim 1, wherein the stator conductor is configured of a short-circuited conductor.

6. The rotating electrical machine according to claim 1, wherein the first rotor and the second rotor are integrally formed.

7. The rotating electrical machine according to claim 6, wherein the first rotor conductor and the second rotor conductor are configured of an integral cage type conductor.

8. The rotating electrical machine according to claim 1, wherein a rotation locking device which can lock the rotations of at least one of the first and second rotors and the third rotor is disposed.

9. The rotating electrical machine according to claim 1, wherein the third rotor is provided with a permanent magnet as the magnetic pole.

10. A hybrid drive unit provided with a rotating electrical machine and an engine capable of generating power, wherein the rotating electrical machine comprises:

an induction machine which includes a stator having a stator conductor capable of producing a rotating magnetic field and a first rotor having a first rotor conductor capable of producing a rotating magnetic field, and produces an induction current in one of the stator conductor and the first rotor conductor by a rotating magnetic field generated in the other of the stator conductor and the first rotor conductor, thereby exerting a torque between the stator and the first rotor, and a synchronous machine which includes a second rotor coupled to the first rotor and having a second rotor conductor connected to the first rotor conductor and capable of generating a rotating magnetic field, and a third rotor having a magnetic pole for generating field flux and rotatable independent of the second rotor, and exerts a torque between the second rotor and the third rotor by the interaction between the rotating magnetic field generated by the second rotor conductor and the field flux generated by the magnetic pole, and the engine is coupled to one of the first rotor and the third rotor and the hybrid drive unit can output power from the output shaft coupled to the other of the first rotor and the third rotor, wherein the first rotor conductor and the second rotor conductor are connected to cause the rotating magnetic fields, generated when electric current flows through the first rotor conductor and the second rotor conductor, to be in opposite directions between the first rotor conductor and the second rotor conductor, so that a torque exerted to the first rotor and a torque exerted to the second rotor are in the same direction.

* * * * *